3,738,805
METHOD OF PRODUCING PURIFIED
ASBESTOS STRUCTURES
Hans Fetzer, Schwabisch Hall, Germany, assignor to Rex Asbestwerke Graf von Rex KG., Schwabisch Hall, Germany
No Drawing. Filed June 8, 1971, Ser. No. 151,141
Claims priority, application Germany, Dec. 4, 1970, P 20 59 845.2
Int. Cl. D01f 9/06
U.S. Cl. 8—137.5          3 Claims

ABSTRACT OF THE DISCLOSURE

Method of producing purified, shaped asbestos structures which are obtained by processing and coagulating dispersions of asbestos fibers containing organic additives. The structures are purified to remove residues of the organic additives. The purification is effected by subjecting the structures to a solvent treatment with a lower aliphatic alcohol and/or an aqueous solution of an organic base. The lower aliphatic alcohol may be used in mixture with aqueous inorganic bases.

FIELD OF THE INVENTION

The invention is concerned with a method for producing purified, shaped asbestos structures, such as yarns and strands, and is particularly applicable to the manufacture of asbestos stuctures, wherein the structures are obtained from asbestos fibers which are dispersed in an aqueous dispersion by means of a suitable dispersion agent, such as for example, anionactive surfactants, and the dispersion is thereupon shaped into the desired structure, whereupon the structure is thermally or chemically coagulated. The inventive method is concerned with the purification of the coagulated structure prior to being further processed, to remove undesired residues of dispersion agents.

BACKGROUND INFORMATION AND PRIOR ART

In the production of shaped asbestos structures by methods of the kind described hereinabove, it is common practice to use organic auxiliary materials or additives. As a rule, the starting material for the production of the structures is an aqueous asbestos fiber dispersion containing surface active agents, wetting agents, as for example, water soluble soaps, sodium dodecyl benzene sulphonate or other alkylaryl sulphonates. The asbestos fiber dispersion may also contain auxiliary additives in the nature of dispersion stabilizers, viscosity modifying agents and binders for influencing the chemical and/or physical characteristics of the dispersion.

In the further course of manufacturing the asbestos structures from such dispersions and after shaping or preshaping, a physical or chemical treatment is employed for the purpose of negating the dispersing action of the dispersion agent. Thus, for example, in the case of the dispersing agent being in the form of a water soluble soap, the soap may be converted into an insoluble salt or otherwise removed from the solution. The shaped body may be in the nature of a strand which is produced from the dispersion, the strand subsequently being twisted into yarn. At this stage of the manufacturing procedure, the shaped structure, to wit, the strand or the yarn, contains, in addition to the asbestos proper, significant amounts of non-asbestos material, to wit for example, precipitated or unmodified additives which were originally contained in the dispersion and which accompany the asbestos material during the shaping procedure. These additives or residues which are thus in the nature of impurities (hereinafter sometimes referred to as "impurities") seriously and negatively affect the characteristics of the shaped structure. Accordingly it is desired to remove these impurities from the shaped structures prior to their further processing. The removal of the impurities should be as complete as possible while, on the other hand, it should not negatively affect or modify the shaped structures proper. It will be appreciated that it would be of particular advantage if the removal of the impurities could be effected in such a manner that a large proportion of these impurities can be recovered in undecomposed manner so that they can be recycled for the preparation of new dispersions or can be used for other purposes.

Various attempts have been made with the view to removing these impurities. However, from a practical point of view, considerable difficulties occur in the removal due to the affinity of these impurities or additives to the asbestos fibers.

French Pat. 1,383,397 describes a removal procedure which essentially consists of a heat treatment to which the shaped asbestos structures are subjected. In this heat treatment, the asbestos structures are dried in an oven and are subsequently subjected to high temperatures. This procedure, however, has a serious drawback, since the heat treatment results in cracking of the organic substances and the formation of tar-like decomposition products. The presence of these tarry materials has, of course, a very detrimental effect on the asbestos structures.

Another removal procedure is disclosed in U.S. Pat. 2,972,221, which concerns a procedure wherein the organic substances or impurities are washed out.

Although the procedure of the U.S. patent results in removal of a substantial portion of the surface active substances or impurities the fact is that a significant amount is not removed but remains within the asbestos structure. This remaining portion still appreciably and undesirably affects the finished asbestos product. Further, in respect to large asbestos structures, additional difficulties are encountered during the removal of the organic substances due to the large specific surface of the asbestos fibers.

It has also been suggested to purify the asbestos structures, for example asbestos yarn, by means of alkaline substances in aqueous solution. This procedure, however, has not been successful because it has been found that it is not possible to free the asbestos yarns completely from the adhering substances. In practice a residue of about 3 to 5% of the organic impurities always remains on the asbestos yarns. A treatment with aqueous alkali solutions, furthermore, causes swelling of the yarn which makes it impossible further to process the yarns in mechanical manner. For example, such yarns cannot be wound, woven or twisted.

More recently, it has been attempted to effect the purification by means of solvents, such as trichloroethylene gasoline or toluene. However, these attempts have not been successful because the solvent treatment results in a slimy product which can be further processed after complete drying only. To subject the structures to a circulating solvent bath, such as is common in dying procedures; is not possible due to the swelling of the structures.

U.S. Pat 3,452,532, finally discloses a procedure for removing the impurity by heating in a steam current under exclusion of air. While it is true that the purification effect obtained in this manner is significantly higher than in the other prior art procedures, the process of the last-mentioned patent is, however, relatively expensive and requires a considerable expenditure of energy. Further, the requirement that the purification has to be effected in the absence of air renders the procedure relatively cumbersome. It should also be noted that the prior art process referred to results in decomposition of a significant portion of the organic additives so that they cannot be reused again.

SUMMARY OF THE INVENTION

It is a primary object of the invention to overcome the drawbacks and disadvantages of the prior art procedures and to provide a procedure for removing undesirable contaminants or impurities from asbestos structures which is exceedingly simple to carry out and which results in substantially quantitative removal of the impurities without their decomposition.

Another object of the invention is to provide a method of the indicated kind which is carried out at relatively low temperatures and with a minimum of expenditure.

Still a further object of the invention is to recover organic impurities from asbestos structures without substantial decomposition so that the recovered substances can be reused.

Briefly, and in accordance with the invention it has been ascertained that the above objects are superiorly achieved if the purification treatment is carried out with solvents which are lower aliphatic alcohols and/or aqueous solutions of organic bases. The lower aliphatic alcohols may be used in mixture with aqueous inorganic bases.

Accordingly, the invention provides for a purification method for removing organic impurities from shaped asbestos structures which are obtained from asbestos fiber dispersions containing auxiliary agents or additives by shaping and coagulation, wherein the purification is effected with solvents in the nature of lower aliphatic alcohols and/or aqueous solutions of organic bases. In respect to the formation of asbestos structures, reference is had to U.S. Pat. No. 3,475,894.

Suitable lower aliphatic alcohols are the straight or branched alkanols with one to six carbon atoms, such as for example, methanol, ethanol, n-propanol, isopropanol, n-butanol, isobutanol, n-pentanol or alicyclic alcohols, as for example, cyclopentanol and cyclohexanol.

In respect to the organic bases, excellent results are obtained with bases which, in aqueous solution, have a pH value of above 8. Particularly suitable are primary, secondary and tertiary alkyl- and alkanol amines which are liquid at room temperatures, as for example, mono-, di-, triethanolamines, aromatic amines as well as heterocyclic bases, such as pyridine.

As previously set forth, aqueous mixtures of such substances also have a superior cleaning action in the sense of this invention. Thus, for example, a mixture of one or several of the aliphatic alcohols with one or several of the aliphatic amines or alkanol amines yield excellent results.

Other examples for suitable mixtures within the scope of this invention are mixtures of lower aliphatic alcohols with aqueous ammonia or aqueous alkalies. Excellent results are obtained with dimethylformamide as the solvent.

The solvents or solvent mixtures of the invention have the important advantage that they do not exert a swelling action on the asbestos structures. Further, the removal of the impurities from the asbestos structures by the solvents does not result in decomposition of the impurities, so that recovery of the organic substances from the solution obtained after the solvent treatment can be readily effected.

The invention will now be described by several examples, it being understood, however, that these examples are given by way of illustration and not by way of limitation and that many changes may be effected without affecting in any way the scope and spirit of the invention as recited in the appended claims.

EXAMPLE 1

Asbestos fine yarn, produced from an aqueous asbestos fiber dispersion containing an organic dispersing agent, was the starting material for this example. Unextracted fine yarn having a tex value of up to 220 and coming from the spinning machine was wound in open manner on perforated spindles of a diameter of 3.8 cm. and a length of 15.3 cm. The yarn was wound on the spindles to form cylinders of a diameter of 8.9 to 11.4 cm. These cylinders were inserted into containers sufficiently large so as to accommodate 140 cylinders. The cylinders in the container were thereupon subjected to an extraction treatment in a solvent consisting of a mixture of 79.3% of isopropanol, 3.5% of ammonia and 17.2% of water. The extraction was effected at a temperature of 70–75° C. The bath ratio, calculated on asbestos, amounted to 7:7.4. The solution circulated through the container at a rate of 10 times per hour.

The extraction was carried out stepwise in continuous counterflow. Five extraction stages were used which were followed by a steaming stage for the purpose of removing the remaining solvent.

The first extraction was effected with solvent which had been used for four previous washings or extractions. In the following washing or extraction stages, solvents were used which became cleaner from stage to stage until, in the fifth stage, the washing was effected with pure solvent. The procedure was carried out in three containers.

After each change of solvent, the solvent was permitted to drop off from the yarn cake. The moisture content of the yarn amounted to 150% per weight. After the fifth extraction stage, the remaining solvent was removed from the yarn by superheated steam (superheated up to 10° C.). The efficiency per stage amounted to 30 to 40%. The criterion for ascertaining the usability of a solvent system was the annealing loss. Most suitable is thus a solvent which exhibits the lowest annealing loss. The extracted yarn had in the present example an ignition loss of 14 to 15% at 800° C.

The solvent was recovered, together with the condensate of the steaming stage, by means of fractional distillation. Both the azeotropic mixture of isopropanol and water and also the ammonia could be recovered by the proposed procedure. Solvent losses were compensated for prior to starting the next cycle. The used soap could be recovered from the last runs through the fractional column.

EXAMPLE 2

Medium asbestos yarns (220 tex and above) are wound from the spinning machine in open windings on perforated spindles. For the purpose of producing parcels of 12.1 to 12.7 cm. diameter, spindles of 6.4 cm. diameter and a length of 20.3 cm. were used for the medium yarns. These parcels were subsequently inserted into containers which accommodated 440 cylinders. Extraction was then carried out at 70 to 75° C. with a solvent as in Example 1. The bath ratio, calculated on asbestos, amounted to 1:4.9. The solution circulated ten times per hour through the container.

As in Example 1, the procedure was carried out according to the stepwise countercurrent principle. Seven washing or extraction stages and one steaming were used. Four containers were employed.

The moisture content of the yarn, the steaming and the efficiency per stage, the annealing loss of the extracted yarn and the solvent recovery were the same as in Example 1.

EXAMPLE 3

30 meter of wet asbestos raw yarn of a fineness of 1050 tex were wound into a cylindrical ball and inserted into a cylindrical Soxhlet apparatus of 5 cm. diameter and a height of 15 cm. The yarn was then extracted with n-butanol. The extraction was terminated after 20 runs of 300 ml. of the solvent through the apparatus. The wet yarn was then air-dried. The dried yarn had a fineness of 840 tex and an ignition loss of 13.8%. At 800° C. no flaming or glowing could be observed in an air atmosphere.

EXAMPLE 4

Example 3 was repeated except that the n-butanol solvent was replaced by propylamine. The procedure resulted in a yarn of a fineness of 845 tex and an ignition loss of 14.3%. No flaming of the yarn could be observed, and it exhibited only short glowing at 800° C. in air.

EXAMPLE 5

The procedure of Example 3 was repeated, but dimethylformamide was used as the solvent. A yarn of a fineness of 849 tex with an ignition loss of 14.7% was obtained. Only short glowing was observed in an air atmosphere at 800° C.

EXAMPLE 6

The procedure of Example 3 was repeated, but the solvent was a mixture of diethylamine and isopropanol at a ratio of 10:90 to 90:10. The yarn obtained had a fineness of between 843 and 852 tex, while the ignition losses were between 14.5% and 14.8%. In an air atmosphere glowing was observed at 800° C. for a very short period only.

What is claimed is:
1. In a method of producing purified shaped asbestos structures, wherein the structures are obtained by shaping and coagulating dispersions of asbestos fibers containing organic additives, the improvement which comprises that the asbestos structures are purified by treating them with a solvent selected from the group consisting of
   (a) straight-chain or branched monohydric alcohols of 1–6 carbon atoms;
   (b) cyclopentanol or cyclohexanol;
   (c) dimethylformamide, lower alkyl amines which are liquid at room temperature, or mono-, di- or triethanol amine;
   (d) pyridine;
   (e) aqueous solutions of (a), wherein the amount of alcohol is in excess of that of water;
   (f) mixtures of (a) and (c);
   (g) mixtures of (a) with aqueous ammonia and water, wherein the amount of alcohol is in excess of the combined amount of water and ammonia.
2. The improvement as claimed in claim 1, wherein the purification is carried out with a mixture of ammonia, water and isopropanol, the amount of isopropanol being in excess of the combined amount of ammonia and water.
3. The improvement as claimed in claim 1, wherein the purification is carried out with a mixture of at least 70% of n-isopropanol, 3.5% of ammonia and 10% of water.

References Cited
UNITED STATES PATENTS 2,972,221  2/1961  Wilke et al. _____ 264—83

MAYER WEINBLATT, Primary Examiner

U.S. Cl. X.R.

8—137; 57—58, 89, 156; 162—3; 264—233